2,778,812
Patented Jan. 22, 1957

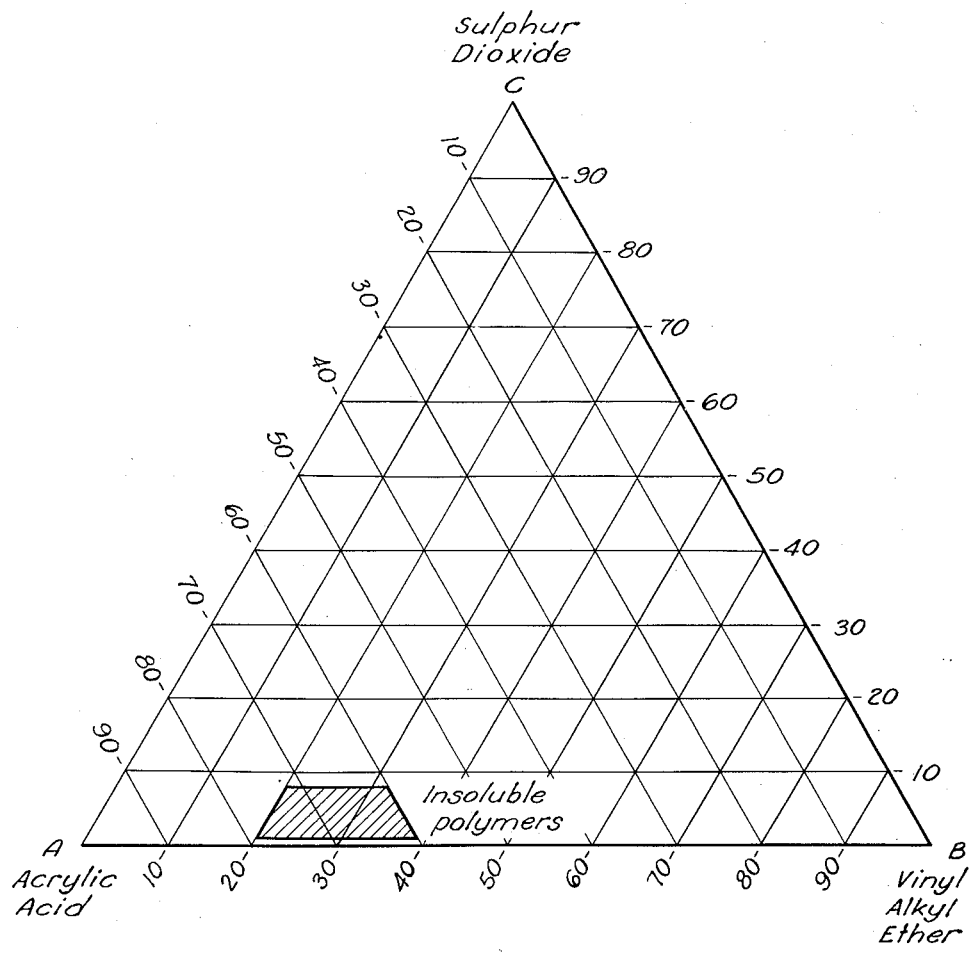

2,778,812

WATER SOLUBLE COPOLYMERS OF SO₂, AN ACRYLIC ACID AND A VINYL ALKYL ETHER

Robert R. Dreisbach and John F. Mulloy, Midland, Mich., assignors to The Dow Chemical Company, Midland, Mich., a corporation of Delaware Application November 23, 1953, Serial No. 393,594

5 Claims. (Cl. 260—79.3)

This invention relates to new and useful polymeric products made from certain olefinic substances and sulfur dioxide and to processes for producing the same.

Sulfur dioxide and unsaturated compounds, such as olefins, are known to react in the presence of suitable catalysts to produce polymeric materials. Generally such materials exhibit thermoplastic properties that make them useful as molding materials, but they are frequently so insoluble in water or other common, low cost solvents as to have little utility in casting and coating operations. Those solubility characteristics have prohibited the application of such materials in many uses, such as textile sizing, where their other properties would be most desirable. When the materials are prepared at low molecular weight or are otherwise modified by chemical reaction to increase the solubility, these desirable properties are also lost.

The provision of new polymeric materials soluble in water and other common solvents is accordingly the principal object of this invention.

It has now been found that sulfur dioxide, acrylic acid, and certain vinyl alkyl ethers may be polymerized in certain limited proportions to produce polymers that are water soluble and film forming.

The vinyl alkyl ethers that may be employed in producing the products of this invention are those containing a single vinyl group and in which the alkyl group contains from 1 to 4 carbon atoms. Larger alkyl groups may be employed but the water solubility of the resulting polymers is usually lessened. The invention is not limited to vinyl alkyl ethers, but may also include ethers containing substituted alkyl group, such as haloalkyl or methoxy alkyl groups. As typical examples of such ethers may be mentioned vinyl 2-chloroethyl ether and vinyl 2-methoxyethyl ether.

Methacrylic acid may be substituted for the acrylic acid without any appreciable change in the properties of the polymers.

The amounts of the polymerizable compounds which may be employed are as illustrated on the annexed drawing in which Apex A represents the acrylic acid, Apex B the ether, and Apex C the sulfur dioxide. It may be seen that the acrylic acid may be employed in amounts of from 60 to 79 percent, the ether in amounts of from 20 to 39 percent, and the sulfur dioxide in amounts of from 1 to 8 percent. When larger amounts of the ether are used, the water solubility of the polymers is decreased. Larger amounts of acrylic acid may be employed, but no additional benefits accrue, and the polymers are more expensive to prepare, and are corrosive to polymerization vessels.

The polymerization may be carried out by any well-known method, but it is preferred to polymerize in an aqueous solution. In a typical example the water, a water-soluble polymerization catalyst, the vinyl alkyl ether and acrylic acid are charged into a polymerization vessel, which is then cooled to about −10° C. Liquid sulfur dioxide is added and the vessel is sealed. The mixture is agitated at a temperature of from 30° to 50° C. until polymerization is substantially complete (about 16–20 hours). The vessel is cooled and unsealed and the polymerized mixture steam distilled to remove any unpolymerized monomers. For many purposes the remaining solutions are suitable to be used directly. However, for more economical shipping and storing, it is preferred to isolate and dry the polymers by evaporation or by other well-known methods.

When lower temperatures of polymerization are used, the molecular weight of the polymers becomes so high that the polymers in the acid form are only sparingly soluble in water. Their solubility may be increased, however, by forming an alkaline salt of the acid. In this form their film-forming ability is not less than that of the acid form.

The polymers of this invention will form continuous films from aqueous solutions and, after drying, retain their water solubility. They, therefore, led themselves to use as textile sizes. Since the higher molecular weight polymers tend to swell and to dissolve less readily than the lower molecular weight counterparts, they are well adapted as soil conditioning agents. These compounds differ from the usual agents in having sulfur atoms integrated into the polymer chain.

The literature states that vinyl alkyl ethers are unstable in acidic media. It was, therefore, surprising that we were able to copolymerize vinyl alkyl ethers with acrylic acid and sulfur dioxide.

The polymers of this invention and the methods of producing them will be more apparent from the following illustrative examples. The recited proportions are given in parts by weight.

Example 1

Into a sealed and jacketed polymerization vessel was put 25 parts vinyl n-butyl ether, 50 parts acrylic acid, 150 parts water, and 1.5 parts ammonium persulfate. The vessel was cooled to −10° C. and 25 parts liquid sulfur dioxide added. Polymerization was initiated by warming the vessel to 42° C. with agitation. After 16 hours, the reaction mixture was cooled, the vessel was opened, and the mixture was steam distilled to remove unreacted monomer. A portion of the resulting aqueous solution was evaporated to dryness. The polymer, upon analysis, was found to contain 6.88 percent sulfur dioxide, 17 percent vinyl n-butyl ether, and 76.12 percent acrylic acid. The dried polymer was easily redissolved in water.

When nylon fibers were dipped into aqueous solutions of the acid form of the polymer, clear continuous films formed having good adhesion to the fibers. Saran fibers could also be sized in the same manner.

In a similar manner polymers were prepared from acrylic acid, sulfur dioxide, and vinyl ethyl ether. These polymers likewise showed good adhesion when applied from aqueous solution to nylon fibers and did not flake or break when the fibers were subjected to flexing.

Example 2

Polymers were prepared by the method of Example 1 containing different vinyl alkyl ethers in the proportions shown in Table 1. These polymers were separated from their aqueous phase by precipitation with acetone. Miami silt loam soil, known to be subject to severe compaction and puddling in the field, was air dried and sieved through a 10 mesh screen. 0.15 gram portions of the polymers were dissolved in 30 milliliter portions of water. The resulting solutions were mixed with stirring with separate 300 gram portions of the dry, sieved soil to provide soil compositions containing 0.05 percent by weight of the respective polymer. Each treated portion of soil was placed in a standard soil tube having a 1⅞ inch inside diameter and gently tamped to obtain a soil column of 6 inches in depth. The columns so-prepared were wetted to saturation and allowed to stand 72 hours. Thereafter, a constant head of water was maintained over the soil columns for a period of 24 hours, and the rate of percolation of water through the soil was determined. An untreated portion of the Miami silt loam was submitted to the same procedure to serve as a control. The results obtained are listed in the following table.

TABLE 1

| Vinyl Alkyl Ether | Percent Ether | Percent $SO_2$ | Percent Acrylic Acid | Percolation Rate (mls./hr.) |
|---|---|---|---|---|
| Untreated control | | | | 16 |
| Vinyl butyl ether | 36.2 | 3.6 | 60.2 | 1,008 |
| Vinyl isobutyl ether | 24.8 | 4.3 | 70.9 | 594 |
| Vinyl ethyl ether | 24.5 | 5.2 | 70.3 | 1,811 |

*Example 3*

Upon completion of the percolation determination in Example 2, the soil samples were allowed to drain for 16 hours and removed from the tubes. A 200 gram portion of each of the wet soil samples was separately placed on a standard 14 mesh sieve (Tyler sieve series) superimposed on a 32 mesh sieve. The sieve combination was then agitated for a period of about 2 minutes in a tank of water until all of the fine non-aggregated soil was screened out. By this procedure water-stable aggregates having diameters of 0.5 millimeter or greater were retained on the screens. These aggregates were allowed to drain for 5 minutes and weighed. The results are reported in the following Table 2 as percent by wet weight of the soil.

TABLE 2

| Vinyl Alkyl Ether in Copolymer | Percent Aggregate |
|---|---|
| Untreated control | 13.0 |
| Vinyl butyl ether | 43.0 |
| Vinyl isobutyl ether | 28.5 |
| Vinyl ethyl ether | 36.5 |

A marked improvement is noted in soil treated with the new copolymers, both in percolation rate and in soil aggregation.

We claim:

1. A water-soluble ternary polymer of sulfur dioxide, at least one acid from the group consisting of acrylic and methacrylic acids, and a vinyl alkyl ether in which the alkyl group contains from 1 to 4 carbon atoms, the amount of sulfur dioxide being from 1 to 8 percent, that of the acid being from 60 to 79 percent, and that of the ether being from 20 to 39 percent of the polymer weight.

2. A water-soluble ternary polymer as claimed in claim 1 consisting of from 60 to 79 percent acrylic acid, from 1 to 8 percent sulfur dioxide, and from 20 to 39 percent vinyl ethyl ether.

3. A water-soluble ternary polymer as claimed in claim 1 consisting of from 60 to 79 percent acrylic acid, from 1 to 8 percent sulfur dioxide, and from 20 to 39 percent vinyl butyl ether.

4. A water-soluble ternary polymer as claimed in claim 1 consisting of from 60 to 79 percent acrylic acid, from 1 to 8 percent sulfur dioxide, and from 20 to 39 percent vinyl isobutyl ether.

5. A water-soluble neutral salt of the ternary polymer claimed in claim 1.

References Cited in the file of this patent

UNITED STATES PATENTS

| 1,984,417 | Mark | Dec. 18, 1934 |
| 2,114,292 | Frey | Apr. 19, 1938 |